US009753836B2

(12) United States Patent
Menon et al.

(10) Patent No.: US 9,753,836 B2
(45) Date of Patent: Sep. 5, 2017

(54) LOW POWER DEBUG ARCHITECTURE FOR SYSTEM-ON-CHIPS (SOCS) AND SYSTEMS

(71) Applicant: Intel Corporation, Santa Clara, CA (US)

(72) Inventors: Sankaran Menon, Austin, TX (US); Babu Trp, Bangalore (IN); Rolf Kuehnis, Vesilahti (FI)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 14/484,427

(22) Filed: Sep. 12, 2014

(65) Prior Publication Data

US 2016/0077905 A1 Mar. 17, 2016

(51) Int. Cl.
*G06F 11/00* (2006.01)
*G06F 11/36* (2006.01)

(52) U.S. Cl.
CPC .............. *G06F 11/3648* (2013.01)

(58) Field of Classification Search
CPC .......... G06F 11/3466–11/348; G06F 11/3648–11/3656
See application file for complete search history.

(56) References Cited

U.S. PATENT DOCUMENTS

| | | |
|---|---|---|
| 7,260,745 B1 | 8/2007 | Edwards et al. |
| 7,610,482 B1 * | 10/2009 | Lok .................. G06F 11/0778 713/1 |
| 2002/0069042 A1 * | 6/2002 | Swoboda .......... G01R 31/31705 703/19 |
| 2003/0140263 A1 | 7/2003 | Arends et al. |
| 2004/0078685 A1 | 4/2004 | Glass |
| 2005/0240822 A1 * | 10/2005 | Miyamoto ........ G06F 11/0727 714/37 |

(Continued)

FOREIGN PATENT DOCUMENTS

WO 2011104245 9/2011

OTHER PUBLICATIONS

International Searching Authority, "Notification of Transmittal of the International Search Report and the Written Opinion of the International Searching Authority," mailed Nov. 30, 2015 in International application No. PCT/US2015/044958.

(Continued)

*Primary Examiner* — Jason Bryan
(74) *Attorney, Agent, or Firm* — Trop, Pruner & Hu, P.C.

(57) ABSTRACT

In an embodiment, a debug architecture for a processor/System on Chip (SoC) etc., includes a central debug unit to receive one or more functional debug signals, the central debug unit further configured to receive debug information from at least one firmware source, at least one software source, and at least one hardware source, and to output compressed debug information; a system trace module to receive the compressed debug information and to time stamp the compressed debug information; a parallel trace interface to receive the time stamped compressed debug information and to parallelize the time stamped compressed debug information; and an output unit to output the parallelized time stamped compressed debug information on one of a plurality of output paths. Other embodiments are described and claimed.

22 Claims, 8 Drawing Sheets

(56) References Cited

U.S. PATENT DOCUMENTS

| | | | |
|---|---|---|---|
| 2010/0268990 A1 | 10/2010 | Xu et al. | |
| 2013/0254596 A1* | 9/2013 | Eder | G06F 11/3636 714/45 |
| 2014/0013011 A1* | 1/2014 | Hopkins | G06F 11/3636 710/14 |
| 2015/0278068 A1* | 10/2015 | Swanson | G06F 11/3476 713/2 |
| 2015/0278070 A1* | 10/2015 | Chinkov | G06F 11/3419 714/45 |

OTHER PUBLICATIONS

U.S. Appl. No. 14/340,802, filed Jul. 25, 2014, entitled "Adaptive and Independent Thermal Control of a Multicore Processor," by James S. Ignowski.

Intel Corporation, "Intel® Atom™ Processor E3800 Product Family," Jul. 2014, 4 pages.

\* cited by examiner

LOW POWER DEBUG ARCHITECTURE FOR SYSTEM-ON-CHIPS (SOCS) AND SYSTEMS

TECHNICAL FIELD

Embodiments relate to debug operations for integrated circuits and systems incorporating such circuits.

BACKGROUND

Modern system on chips (SoCs) and other integrated circuits (ICs) are designed with low power directives to achieve longer battery life. Debug of such ICs and SoCs is extremely challenging due to multiple low power domains that are designed in the devices that wake up and sleep with much higher granularity compared to previous generations. Currently available debug solutions provide limited capability to perform debugging of firmware and low power operation.

DETAILED DESCRIPTION

In various embodiments, a power-aware low power debug architecture is provided for processors and other systems on chip (SoC), including systems in a package (SiP), multi-chip package (MCP), e.g., such that a wide variety of aspects of these devices as implemented in a system can be tested/debugged, such as firmware operations including but not limited to boot up, low power operations including but not limited to low power state entry/exit, among others. This debug architecture may be used for debug of low power tablet and smartphone ICs/SoCs, embedded devices such as Internet of Things (IoT) devices, wearables and so forth, and low power devices used in client/server applications. Embodiments thus provide hardware/software/firmware observability during early boot debug, low power conditions and low power entry/exit transitions to provide effective debug of an entire operation range of a system. In different embodiments, debug triggers may be included in any of firmware, operating system or other software to trigger points at which debug information may be selectively collected, to test a variety of platform operating conditions.

Still further, as advanced ICs/SoCs have much more stringent power consumption requirements, embodiments provide techniques to selectively enable and disable the debug logic so that the power consumption of such logic can be avoided in the large number of shipped products having such processors. However, understand that embodiments may further provide for a selective enable when one of these products is returned from the field for debug/failure analysis.

In various embodiments, a power-aware low power debug scheme enables early boot debug of logic that operates in an Always-ON (AON) domain. In an embodiment, a central debug unit, which is a main controller for debug operations, may be configured with minimal logic and may be maintained in the AON domain or an independent debug power domain to enable debugging the logic that is active early in the power up stage and during low power transitions, which often may be the most difficult circuitry within a processor to debug.

In this way, debug operations may be performed beginning at early boot, as well as during low power transitions as the debug path and the debug logic are maintained in an AON or debug power domain. That is, if in a given design, the inclusion of the debug logic causes a power consumption target of the processor or platform (e.g., according to a design specification) to be exceeded, the debug logic can be placed in a separate debug power domain. This independent debug power domain may be maintained separate from the AON power domain and one or more controllable power domains that may include cores and other functional units of the processor. Then the debug power domain can be configured during manufacture to be permanently powered off (e.g., via fusing one or more of a set of configuration fuses or other configuration values) before shipping to save power, including lost power due to leakage current lost in this debug power domain. In case power needs to be applied on returned parts for return material authorization (RMA) debug or for another reason (e.g., field testing), a fuse override may be provided, e.g., via a test access port (TAP) controller.

Figure 1:
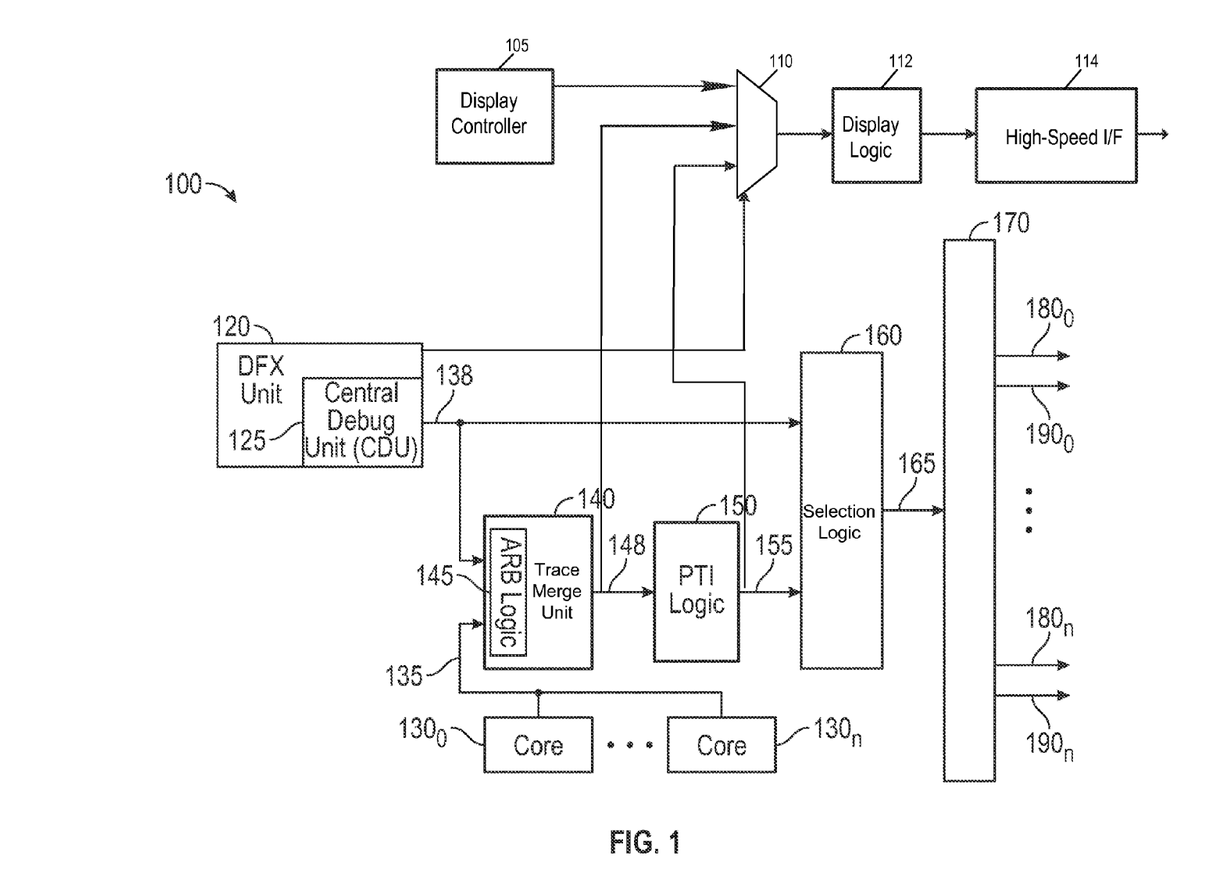
FIG. 1 is a block diagram of a portion of a processor in accordance with an embodiment.

Referring now to FIG. 1, shown is a block diagram of a portion of a processor such as an SoC in accordance with an embodiment. The portion of SoC 100 shown primarily relates to design for X (DFx) circuitry, which may be used for various purposes including design for test, design for validation, design for debug and so forth (the X in the DFx can be replaced by "T" to denote Design for Test, "D" to denote Design for Debug, "V" to denote Design for Validation and so forth). This particular design is for the purpose of Design for Debug, as this logic is primarily used for debug purposes. In general, such circuitry may be used to receive inputs from one or more functional units of the processor or other debug host and appropriately process such information into a desired format for delivery internal or external to the debug host. Such DFx circuitry may be used during the course of processor design, development and debug, and further may be used during incorporation of the processor into a platform such as a portable computing device, e.g., a smartphone, tablet, phablet, or any other portable or other computing device. Of course, the DFx circuitry also may be used for post-platform manufacture test and debug operations.

In the embodiment shown, SoC 100 may include several functional circuitry including one or more cores $130_0$-$130_n$. In an embodiment, such cores may be a set of heterogeneous or homogeneous cores, e.g., of a given Intel® architecture (IA) design. Of course in other embodiments, cores of other manufacturers such as cores based on an ARM architecture instead may be present. And in other embodiments, combinations of Intel®-based cores and ARM-based cores or other logic may be present.

In general, the remainder of the circuitry shown in FIG. 1 relates to DFx circuitry of the processor. As seen, a DFx unit 120 is configured to receive input from a variety of on-chip sources, including different collections of hardware, firmware, and/or software. DFx unit 120 includes a central debug unit (CDU) 125 configured to collect the various inputs received from the different sources and send along selected debug signals via a first internal interconnect 138. During operation, debug signals including hardware (HW), software (SW) and firmware (FW) debug traces are sent to CDU 125. As used herein, "trace" refers to a streaming set of signals or other information obtained from a desired on-chip location, and may generally provide information regarding activity visible in real-time or stored and later retrieved for viewing by a given user, such as an applications developer, applications program, or external equipment to observe system activity. Note that the internal debug signals received from various functional units of the processor can be collated using block level selectors in individual blocks, mid-level selectors in intermediate blocks such as uncore logic between the debug block of interest, and a final selector within CDU 125. Signals pertaining to low power debug may be placed in an AON domain within the block and sent as AON signals to enable low power debug. Alternately, as described above, these signals may also be placed in a debug domain (which can either be fused off after manufacturing test/debug or to be disabled at manufacture by alternate means).

In an embodiment, at least a portion of central debug unit 125 may be maintained in the AON power domain with only the required logic powered by this domain, to minimize power consumption by the debug logic. In an embodiment, CDU 125 includes a centralized packetizer, trigger logic, and compression logic. Of course, understand that in other embodiments additional logic may be present in CDU 125. In an embodiment, these debug signals output from CDU 125 may be a set of minimally processed debug signals which, as shown, may be provided to multiple destinations, including a selection logic 160 and a trace merge unit 140.

As further shown, trace merge unit 140 also receives incoming functional debug signals, which in an embodiment may take the form of real-time instruction trace (RTIT) signals (and/or real time data trace signals) or a proprietary form of debug signals such as Intel® processor trace (PT) traces or other trace technologies. To this end, trace merge unit 140 includes an arbitration logic 145 configured to perform arbitration between the internal debug signals and the functional debug signals or other core debug signals to thus arbitrate between these different paths of incoming signals and provide the selected signals to a remaining portion of trace merge unit 140.

In general, trace merge unit 140 is configured to further process the CDU output by adding time stamp information. In turn, trace merge unit 140 streams this time stamped debug trace information in a manner compatible with one or more protocols. For example, in an embodiment trace merge unit 140 may be compatible with a Mobile Industry Processor Interface (MIPI) Alliance System Trace Protocol (STP). In another embodiment, trace merge unit 140 may be compatible with an ARM trace funnel that implements a trace wrapper protocol, an ARM embedded trace macrocell (ETM) or other protocol. Of course, other protocols such as RTIT or Intel® PT may be used. By providing internal debug signals via trace merge unit 140, such internal debug signals are time stamped and sent in a given protocol, e.g., a MIPI STP protocol. In turn, these processed and time stamped signals may be output from the processor and received and be used by a given debug tool such as a logic analyzer, a trace port analyzer (TPA), or other tool that deciphers the time-stamped debug stream that is sent out. In such tool, these signals may be deciphered and visualized to perform debug. Still further, time stamping traces enables time-correlation between signals, thus providing ease of debug.

These processed debug signals are provided via an interconnect 148 to a parallel trace interface (PTI) logic 150, which may further process the signals. In an embodiment, PTI logic 150 is configured to parallelize the received debug information. Note that the width of parallelization may be controlled (e.g., 1, 2, 4, 8, or 16) depending on the number of pins or other output paths selected for output. The processed signals are provided via an interconnect 155 to selection logic 160. In general, selection logic 160 is configured to select either the processed signals received via interconnect 155 or the more minimally processed debug signals received via interconnect 138, and output the selected signals via an interconnect 165 to an output unit 170. In general, output unit 170 provides output paths via on-die interconnects to one or more sets of output connections, which in an embodiment may correspond to dedicated output pins of the SoC, input/output (I/O) pins, and/or pins or other interconnection coupled to a system memory, which may be an on-chip static random access memory. In an embodiment, these output connections may include a first set of output pins $180_0$-$180_n$ and a second set of output pins $190_0$-$190_n$. In an embodiment, first output pins 180 may be general purpose IO (GPIO) pins and second output pins 190 may be of another type of pin connection, such as PTI pins. In an embodiment, certain output paths may couple, e.g., via PTI pins, to micro secure digital (SD) pins of a closed-chassis system, which enables form factor debug (FFD) or closed-chassis debug, in addition to debug of an open-chassis.

In some embodiments, instead of parallelization, the processed debug signals from trace merge unit 140 may be sent to a destination via a high-speed serial stream. In this case, trace data can be selected in a selection unit 110 either from the output of PTI logic 150 or from trace merge unit 140 responsive to a Trace Data Sel signal output by CDU 125. In an embodiment, the selection by default for selection logic 110 is to select the output of a display controller 105, and based on debug, the selection is changed to select the debug trace data. This selected output is provided to a display logic 112, which converts the parallel trace data into a serial stream and adds protocol information to drive a high speed serial I/O interface 114. Understand while shown with this particular high level view in FIG. 1, the scope of the present invention is not limited in this regard.

Figure 2:
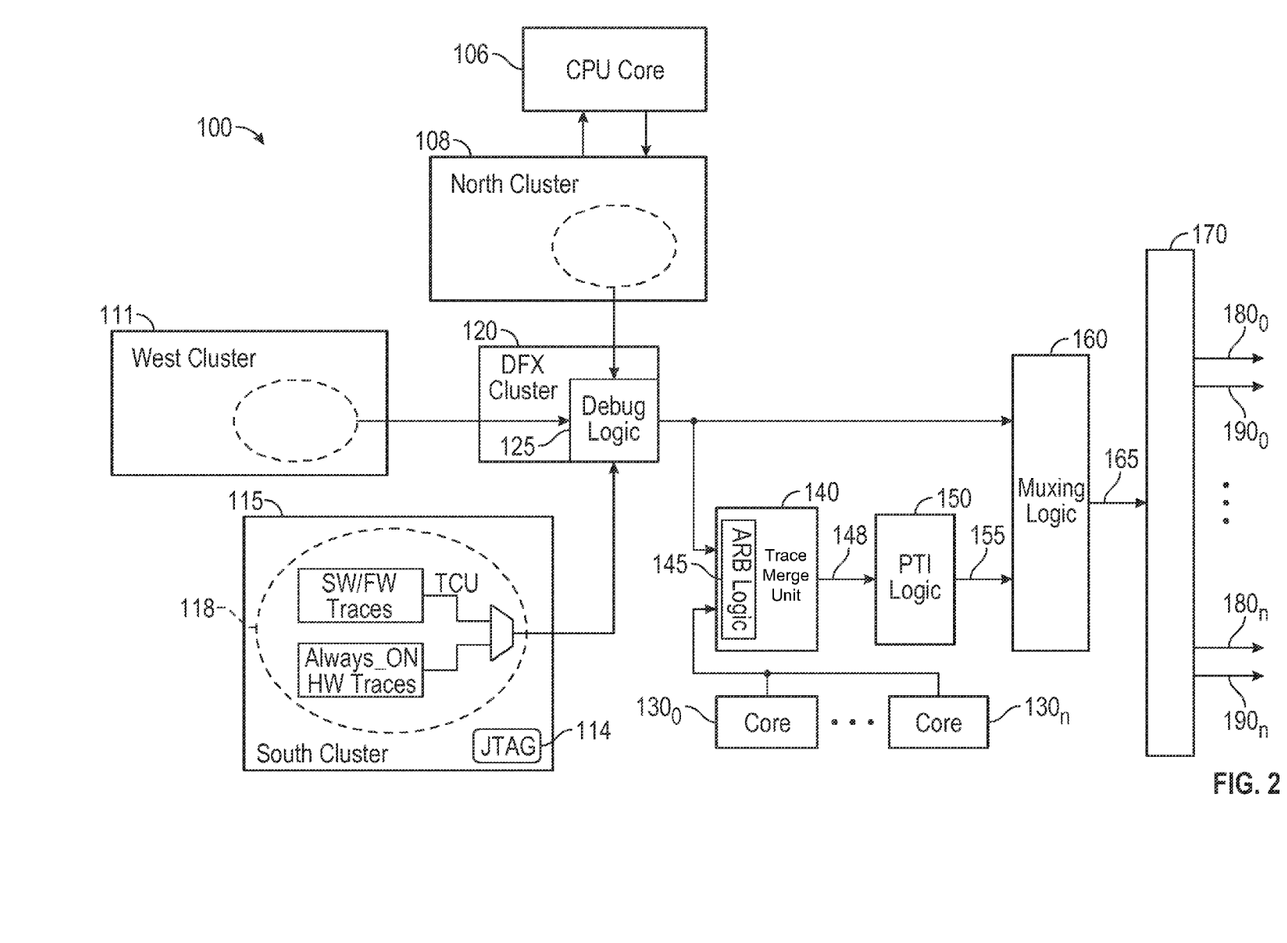
FIG. 2 is another block diagram of a processor in accordance with an embodiment of the present invention.

Referring now to FIG. 2, further details of processor 100 are shown. More specifically, FIG. 2 provides an overall high level view of an SoC including debug circuitry as described above in FIG. 1 in the context of additional SoC circuitry. FIG. 2 shows a core 106 which in an embodiment may be a main central processing unit (CPU) of the SoC, and which in an embodiment may be an advanced out-of-order execution core configured to execute instructions of one or more instruction set architectures. In turn, core 106 couples to a North unit 108, which in an embodiment may include various interface and other control circuitry, such as a memory controller and/or other interface circuitry. As seen, North unit 108 couples to DFx unit 120.

In addition, a West unit 111 also couples to DFx unit 120. In various embodiments, West unit 111 includes one or more processing units, such as one or more coprocessors, graphics processors, fixed function units or so forth. Still further, a South unit 115 may include additional or different functional units, interface units or so forth, and in turn also is coupled to DFx unit 120. Note that additional details with regard to trace collection and communication are seen in South unit 115. More specifically, various traces are provided to a trace collection unit 118 within South unit 115.

In the embodiment shown, message traces include software traces, firmware traces and hardware traces which, in an embodiment may include AON traces, in that these traces relate to circuitry that is powered on, even when a given platform in which the SoC is located is in a low power mode. For example, in the context of a mobile platform such as a smartphone, tablet, Internet of Things (IoT) device or so forth, while the platform is powered but not in use (e.g., with its display off and no user interaction occurring), certain circuitry of the SoC remains always on to maintain connectivity, e.g., to a base station of a wireless communication system such as a cellular system.

In an embodiment, trace collection unit 118 may be controlled by signals received via a Joint Test Action Group (JTAG) unit 119 that receives control signals, e.g., from an off-chip (and off-platform source such as a logic analyzer), e.g., via a JTAG interface of the SoC that in turn couples to JTAG unit 119. In another embodiment, control signals may be received from any other memory mapped input/output (MMIO) access mechanism (e.g., via debug butler, serial wire debug, $I^2C$, or so forth). Accordingly, the various trace signals collected in trace collection unit 118 are provided to DFx unit 120 and more specifically to a debug logic which may correspond to CDU 125 of FIG. 1, for processing as described herein. Note that the remainder of the debug circuitry shown in FIG. 2 may generally correspond to that discussed above as to FIG. 1. Although shown at this high level in the FIG. 2 embodiment, understand the scope of the present invention is not limited in this regard.

Figure 3:
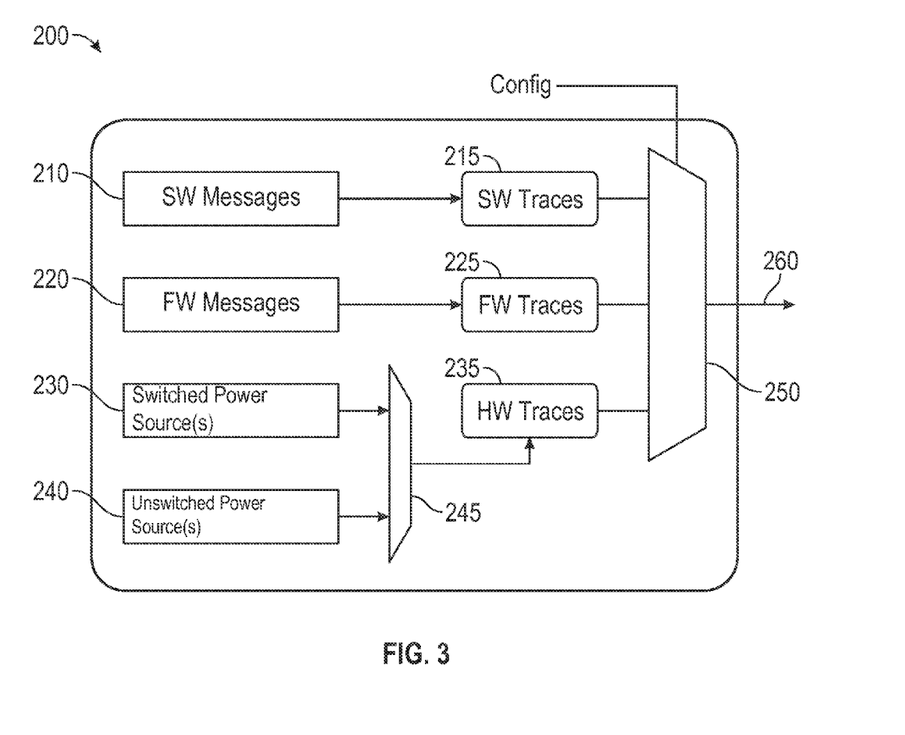
FIG. 3 is a block diagram of a trace collection unit in accordance with an embodiment of the present invention.

Referring now to FIG. 3, shown are further details of a trace collection unit in accordance with an embodiment of the present invention. Note that trace collection unit 200 may generally correspond to trace collection unit 118 of FIG. 2. Understand that multiple such trace collection units may be located, e.g., in different clusters or units of a processor. As seen, trace collection unit 200 is configured to receive incoming trace information from a plurality of sources including software messages 210, firmware messages 220, internal signal multiplexer (or switched power domain) sources 230 and always on (or unswitched power domain) sources 240. Note that a selection unit 245, e.g., a multiplexer, may select between source 230 and source 240.

The various trace information from these sources may be provided to corresponding trace buffers 215, 225, 235 for intervening storage. Finally, a selection logic 250, e.g., another multiplexer, may be controlled in response to configuration signals received via a configuration input to select a corresponding trace for output via an output path 260, e.g., an internal interconnect to couple to a central debug unit or other destination. While shown with this limited circuitry in FIG. 3, understand the scope of the present invention is not limited in this regard.

In an embodiment, hardware traces may be collected within a cluster level, either via an internal debug signal multiplexer architecture where internal signals are connected to a multiplexer tree for observability via multiplexer inputs, or via fabric trace hooks (FTH). Note that such hardware traces may be at the protocol level or regarding low power or transition debug. These HW traces can be sourced from an AON region or otherwise, but in either case the signals are sent to internal debug multiplexers within the AON region, which may avoid the need for store and replay (also known as save and restore). Store and replay instead is used when the state of the machine is to be saved before power is turned off (for power saving purposes) and the state is restored after the machine is powered back up.

In an embodiment, software traces may be flexibly handled within clusters to select software masters dynamically, e.g., using multiplexer selects. In some cases, multiple software masters may be interleaved, if needed for debug. As discussed above, embodiments also provide for handling of firmware (FW) traces, in which such traces may be streamed in real-time, as the AON logic is available for debug.

Using an embodiment, debug information related to low power entry/exit or transition between different power states may be obtained and output. As such, embodiments provide for observability of all kinds of traces as well as events such as HW, SW, FW and internal signals to be made observable at output ports of an SoC or other IC.

Stated another way, embodiments provide observability of hardware (transaction level and signal level), software and firmware traces at all times, including but not limited to early debug, low power entry/exit transitions, as well as for regular run time debug, and further provide signal level observability and transition level observability. Still further, embodiments provide for time stamping of internal debug HW, SW and FW traces by reusing a STM block for processing internal debug stream, in addition to functional unit debug signals.

As such, embodiments allow complete common, efficient and scalable debug capability of all types of debug sources (e.g., hardware, software and firmware), with capabilities of triggering, filtering, packetizing, compressing the debug data to accommodate output bandwidth for effective debug. Also, a debug architecture in accordance with an embodiment may save power in production parts by placing some or all debug logic on a separate debug power plane, in which power to this plane can be turned off, e.g., via a fuse or some other means to power the debug logic off for saving power at the component level, which in turn saves platform power as well with an override capability to enable it to be powered for debug of returned parts.

In addition, as embodiments may be used to perform low power debug (e.g., during an ACPI system low power state such as SOix), output paths may couple to other locations such as a high speed serial trace port comprising a Display Port, PCIe, USB or a Type-C connector by placing the logic in one of the AON or debug power domains. In some cases, trace information may also be communicated via an embedded DFx interface or a direct connect interface (DCI) according to a USB protocol for closed-chassis debug. Embodiments thus may be used for debug of many different kinds of ICs, including low power mobile SoCs and client/server ICs and SoCs, among others.

Figure 4:
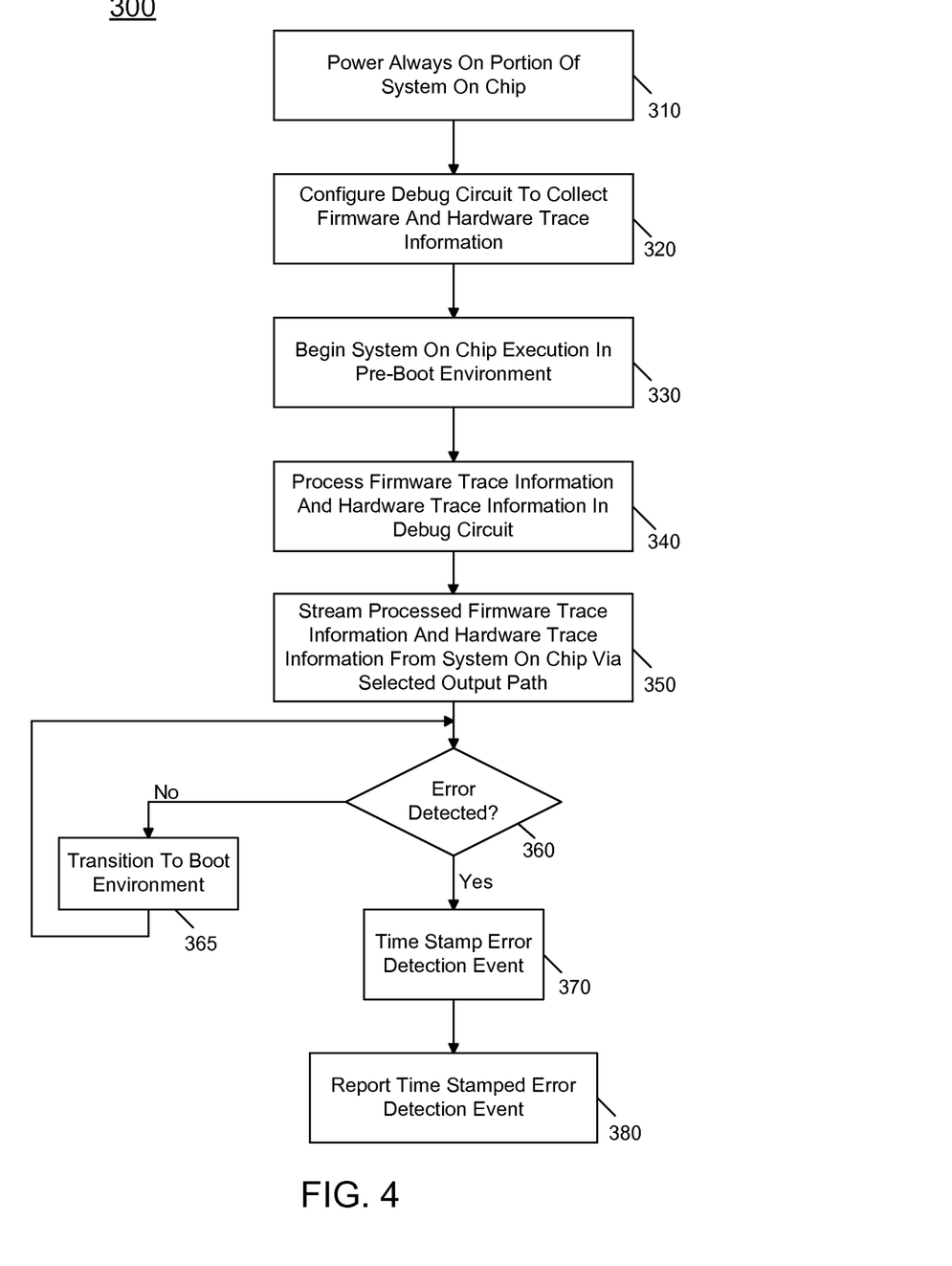
FIG. 4 is a flow diagram of a method in accordance with an embodiment of the present invention.

Referring now to FIG. 4, shown is a flow diagram of a method in accordance with an embodiment of the present invention. More specifically, method 300 of FIG. 4 relates to debug operations performed using debug logic of a SoC during firmware execution. While the particular implementation shown in FIG. 4 is with regard to pre-boot firmware operation, understand the scope of the present invention is not limited to such an environment and the firmware-based debug may equally be performed during normal system operation of a platform including the SoC.

As seen, method 300 begins by powering on an AON portion of the SoC (block 310). At this point in operation, because the platform and the SoC are not fully functional, only a limited portion of the SoC, namely an AON power domain is powered on. Thus in an embodiment in which portions of a debug circuit are located in the AON power domain, these portions too are also powered on. In another embodiment in which debug circuitry instead is incorporated in its own debug power domain, this debug power domain also may be powered on.

Control next passes to block 320 where the debug circuit may be configured to collect firmware and hardware trace information. Such configuring may be performed via a test interface of the SoC, e.g., via a JTAG interface, to cause various selectors such as different levels of a multi-level multiplexer architecture to be configured to provide such hardware and firmware trace information.

Next, control passes to block 330 where SoC operation begins in the pre-boot environment, in which at least a portion of the platform firmware, e.g., in accordance with a Unified Extensible Firmware Interface (UEFI) firmware, such as different modules of a basic input/output system (BIOS) execute. During such operation, the firmware and hardware trace information is processed in the debug circuit (block 340). Responsive to such processing, the processed information may be streamed from the SoC via a selected output path (block 350). For example, in some situations such as during development of a platform in a prototype form, an open chassis arrangement may be present such that the trace information can be streamed out via a set of GPIO pins (or a portion of such pins), or sent to memory for later extraction and debug or sent via alternate pins for debug purposes. Instead when a platform design is further along and a fully functional platform exists, closed chassis debug operations may occur, and trace information may be streamed out via other output paths, such as via a set of one or more micro SD pins or other pins such as HDMI, USB or alternate pins that are available on a final product.

Still referring to FIG. 4, during platform debug, it can be determined based on the streamed trace information, whether an error is detected (diamond 360). If not, the platform can transition to a boot environment (block 365). Note that upon transferring to a boot environment (e.g., according to a given OS) additional configuration of the debug circuitry may occur so that instead of obtaining firmware trace information, software trace information may be obtained (in addition to certain hardware trace information).

If instead one or more errors are detected during the pre-boot environment, control passes to block 370 where an error detection event may be time stamped. In an embodiment, such time stamp may be effected in part using time stamp information of the received streaming trace information, which may be received in a format including time stamps. Finally at block 380 the time stamp error detection event may be reported, e.g., to a user of a trace analysis tool to which the platform is coupled. Understand while shown at this high level in the embodiment of FIG. 4, the scope of the present invention is not limited in this regard.

Figure 5:
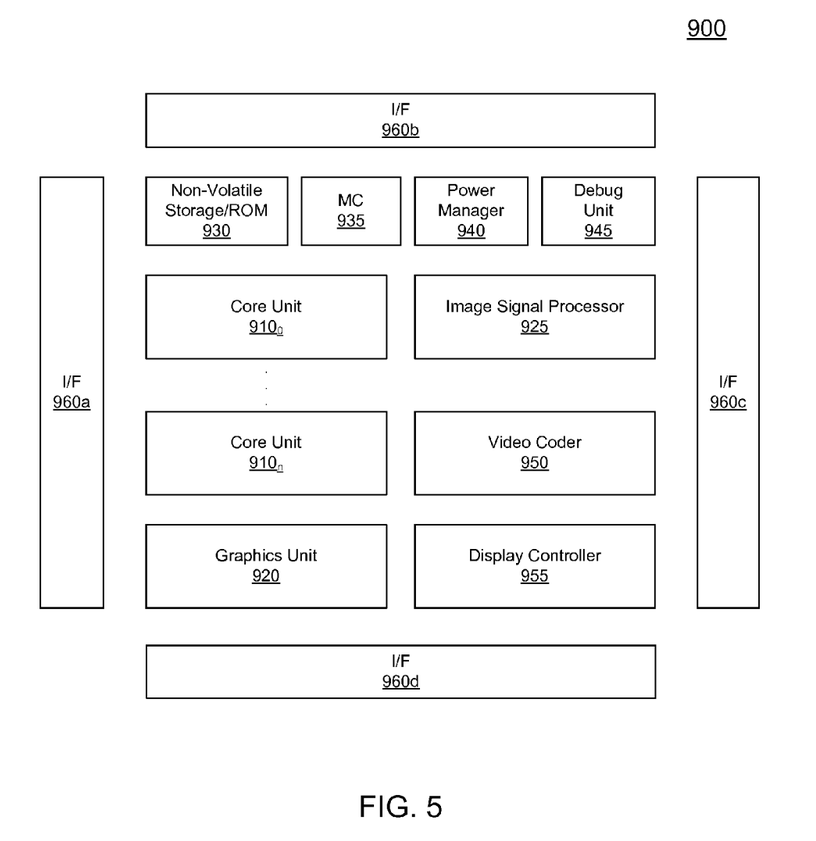
FIG. 5 is a block diagram of a system in accordance with an embodiment of the present invention.

Referring now to FIG. 5, shown is a block diagram of a system in accordance with an embodiment of the present invention. In the embodiment of FIG. 5, system 900 may be a SoC including multiple domains, each of which may be controlled to operate at an independent operating voltage and operating frequency. As a specific illustrative example, system 900 may be an Intel® Architecture Core™-based SoC such as an i3, i5, i7 or another such processor available from Intel Corporation. However, other low power SoCs or processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer, IoT device, wearable, or other portable computing device.

In the high level view shown in FIG. 5, SoC 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the SoC. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 5).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 5, a video coder 950 may perform coding operations including encoding and decoding for video information, e.g., providing hardware acceleration support for high definition video content. A display controller 955 further may be provided to accelerate display operations including providing support for internal and external displays of a system. In addition, a debug unit 945 may be present and which may include a low power debug architecture as described herein. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. Although shown at this high level in the embodiment of FIG. 5, understand the scope of the present invention is not limited in this regard.

Figure 6:
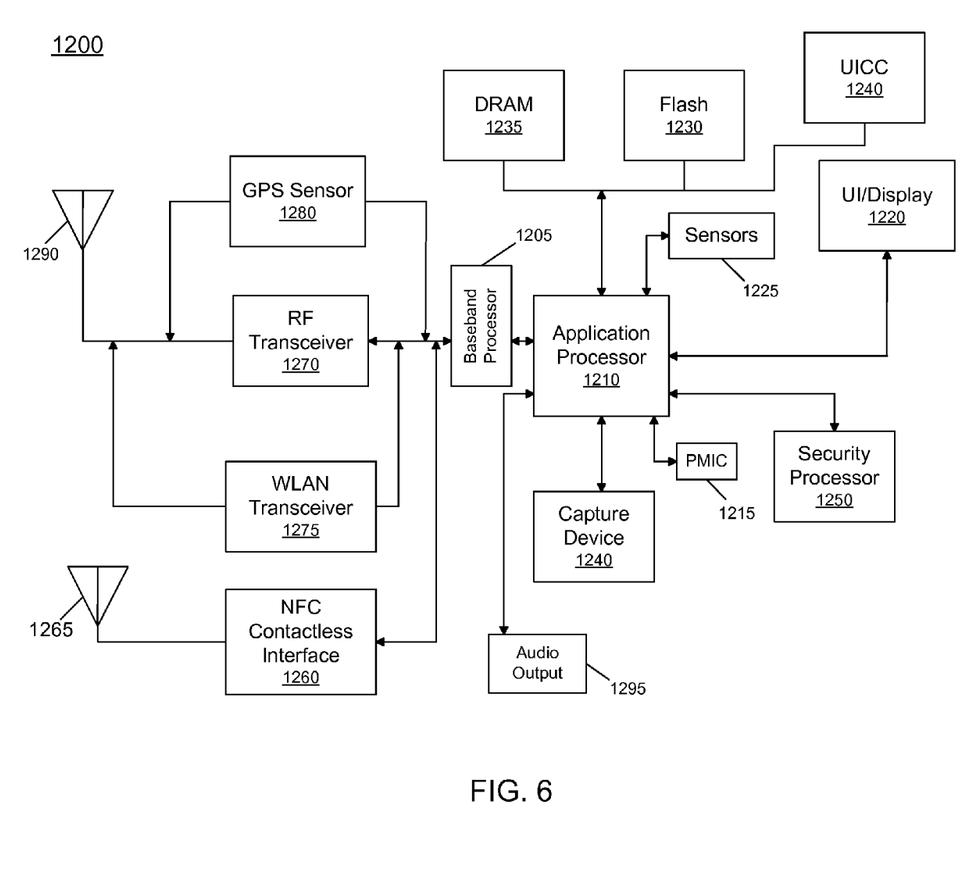
FIG. 6 is a block diagram of an example system with which embodiments can be used.

Referring now to FIG. 6, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main SoC of the system to execute an OS and other system software, in addition to user applications such as many well-known social media and multimedia apps. Application processor 1210 may further be configured to perform a variety of other computing operations for the device, and may include a low power debug architecture as described herein.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 6, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 6, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 7:
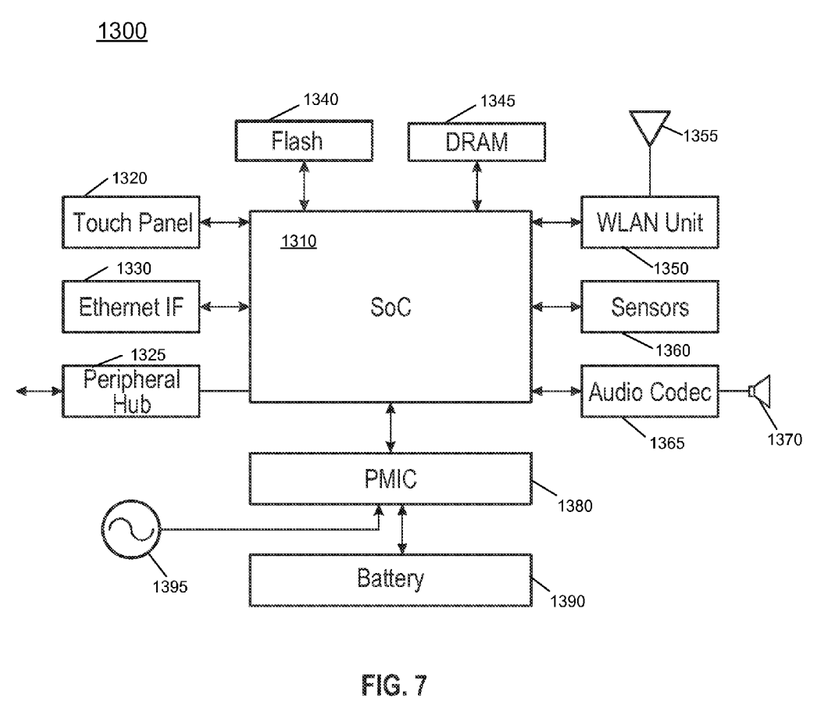
FIG. 7 is a block diagram of another example system with which embodiments may be used.

Referring now to FIG. 7, shown is a block diagram of another example system with which embodiments may be used. In the illustration of FIG. 7, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include a low power debug architecture as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 7, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 7, many variations and alternatives are possible.

Figure 8:
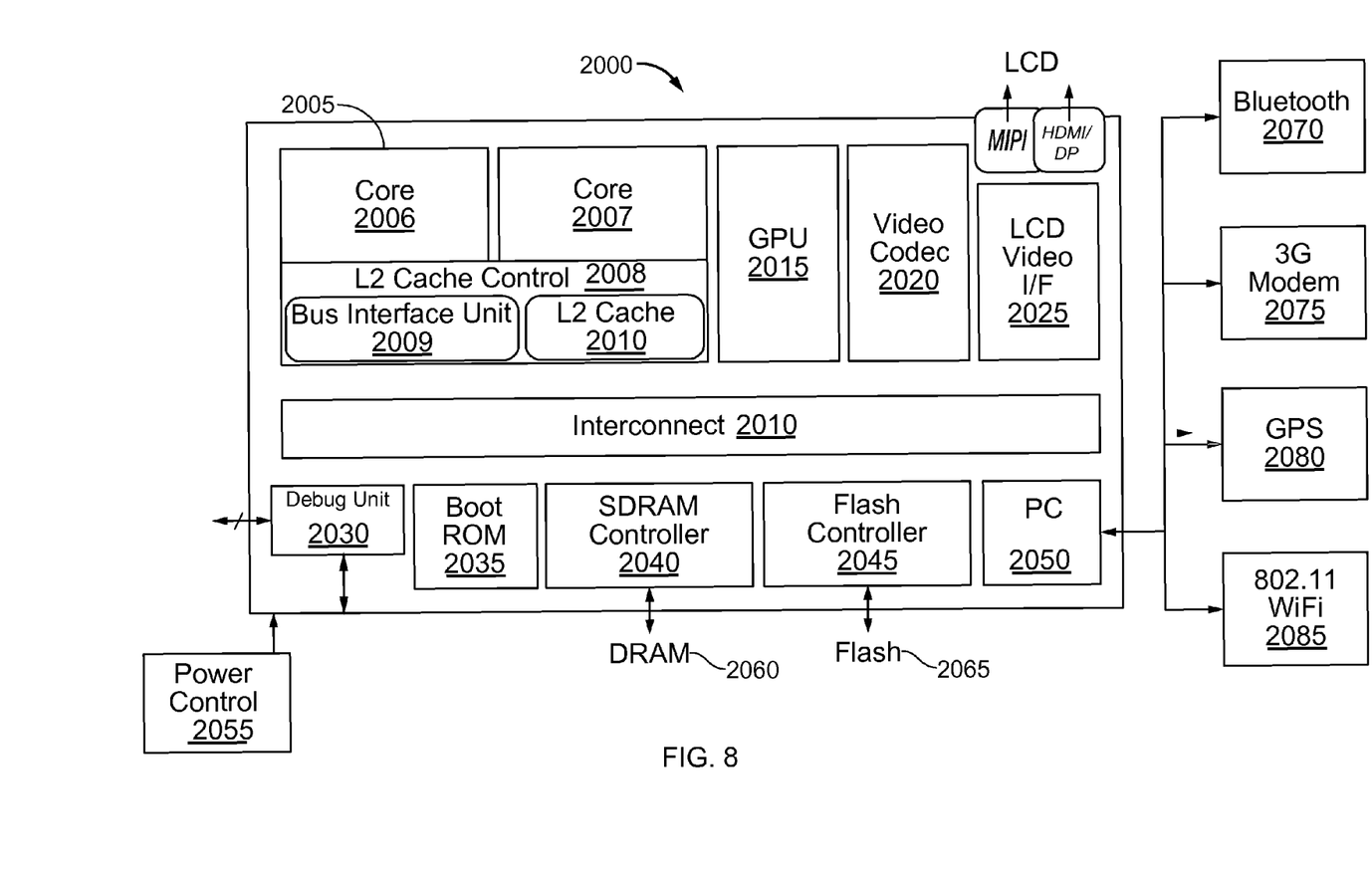
FIG. 8 is a block diagram of a system on a chip in accordance with an embodiment.

Turning next to FIG. 8, an embodiment of a SoC design in accordance with an embodiment is depicted. As a specific illustrative example, SoC 2000 is included in user equipment (UE). In one embodiment, UE refers to any device to be used by an end user, such as a wearable, hand-held phone, smartphone, tablet, ultra-thin notebook, notebook IoT device, or any other similar device. Often a UE connects to a base station or node, which potentially corresponds in nature to a mobile station (MS) in a GSM network.

Here, SoC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect.

Interconnect 2010 provides communication channels to the other components, such as a debug unit 2030, which may have a low power architecture as described herein. As seen debut unit 2030 may interface with a plurality of off-chip connections. Interconnect 2010 also couples to a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input) via one of MIPI or HDMI/DP interface, GPU 2015 to perform graphics related computations, etc.

In addition, the system illustrates peripherals for communication, such as a Bluetooth module 2070, 3G modem 2075, GPS 2080, and WiFi 2085. Also included in the system is a power controller 2055.

The following examples pertain to further embodiments.

In one example, an apparatus comprises: a central debug unit to receive debug signals from a plurality of sources including at least one hardware source, at least one firmware source, and at least one software source; a trace merge unit to receive the debug signals from the central debug unit and having an arbitration logic to select between the debug signals from one or more of the plurality of sources and functional debug signals from a plurality of hardware units, the trace merge unit to time stamp the selected debug signals or functional debug signals; a parallel trace interface to receive the time stamped selected debug signals or functional debug signals and to parallelize the time stamped selected debug signals or functional debug signals; a serial trace interface to receive the time stamped selected debug signals or functional debug signals and to serialize the time stamped selected debug signals or functional debug signals; and a selection unit to receive the debug signals from the central debug unit and the parallelized time stamped selected debug signals or functional debug signals from the parallel trace interface and to select one of the debug signals and the parallelized time stamped selected debug signals or functional debug signals for output on an output path, wherein the output path is to be selected from a plurality of output paths.

In an example, the apparatus comprises a SoC and the plurality of output paths includes one or more of: a set of general purpose input/output pins; a set of micro secure digital pins; a set of memory interconnections; and at least one universal serial bus pin. The selection unit may be configured to output the selected debug signals on the output path corresponding to the set of micro secure digital pins when the SoC is configured within a portable device having a closed chassis.

In an example, the apparatus further comprises a distributed selection unit having: a first selection unit located in a first functional unit of a SoC comprising the apparatus; a second selection unit located in uncore logic of the SoC, the second selection unit to receive an output from a plurality of first selection units including the first selection unit; and a third selection unit to receive an output from a plurality of second selection units including the second selection unit, and output selected debug signals to the central debug unit.

In an example, the apparatus further comprises a trace collection unit configured to receive trace control signals via a test interface of the SoC and, responsive to the trace control signals, to select one of hardware trace information, software trace information and firmware trace information for output from the trace collection unit to the central debug unit.

In an example, the firmware comprises a boot code for the SoC.

In an example, the apparatus comprises a first power domain including a first portion of the central debug unit and a second power domain including a second portion of the central debug unit, where the first power domain is to remain powered on and the second power domain is to be powered off while the SoC is to operate in a low power mode.

In an example, the first portion of the central debug unit is to receive and process debug signals associated with the low power mode.

In an example, the apparatus further comprises a fuse logic configured to disable at least the first portion of the central debug unit during user operation of a portable device including the SoC, where the fuse logic is configured prior to inclusion of the SoC in the portable device. The fuse logic may be configured to be overwritten to enable the first portion of the central debug unit during debug operation of the portable device.

In an example, the parallelized time stamped selected debug signals or functional debug signals are compatible with a MIPI Alliance system trace protocol.

In an example, the SoC is incorporated in a user equipment touch-enabled device.

In another example, a system comprises a display and a memory, and includes the apparatus of one or more of the above examples.

In another example, at least one computer readable medium includes instructions that when executed enable a system to: configure a debug circuit of a processor to collect firmware trace information and hardware trace information, the debug circuit having a first portion located in a first power domain to be powered on when a platform including the processor is on and a second portion located in a second power domain to be powered off when the platform is in a low power state; in a pre-boot environment of the platform, process the firmware trace information and the hardware trace information in the debug circuit; and stream the processed firmware trace information and the processed hardware trace information from the processor to an analysis tool coupled to the platform via a selected output path of the processor.

In an example, the at least one computer readable medium further comprises instructions that when executed enable the system to time stamp an error detection event responsive to detection of an error based on information in at least one of the processed firmware trace information and the processed hardware trace information.

In an example, the at least one computer readable medium further comprises instructions that when executed enable the first portion of the debug circuit in the pre-boot environment and disable the second portion of the debug circuit in the pre-boot environment.

In an example, processing the firmware trace information comprises one or more of filtering, packetization, and compression of the firmware trace information.

In another example, a SoC comprises: at least one core to execute instructions, the at least one core including first debug logic to provide first functional debug signals regarding operation of the at least one core; uncore logic coupled to the at least one core to perform non-core operations, the uncore logic including second debug logic to provide second functional debug signals regarding operation of the uncore logic; a central debug unit coupled to the at least one core and the uncore logic to receive the first and second functional debug signals, the central debug unit further configured to receive debug information from at least one firmware source and at least one software source and to output compressed debug information; a trace merge unit to receive the compressed debug information and to time stamp the compressed debug information; and an output unit to output the time stamped compressed debug information on one of a plurality of output paths, the one output path to be selected according to a configuration provided to the SoC via a test interface.

In an example, the plurality of output paths includes one or more of: a set of general purpose input/output pins; a set of micro secure digital pins; a set of memory interconnections; and at least one serial pin.

In an example, the SoC comprises a first power domain to remain powered on when a platform including the SoC is on and a second power domain to be powered off when the platform is in a low power state, where the central debug unit includes a first portion included in the first power domain and a second portion included in the second power domain.

In an example, the SoC further comprises a fuse logic configured to disable the central debug unit, the trace merge unit, and the output unit during user operation of a platform including the SoC, where the fuse logic is to be overwritten to enable at least a portion of the central debug unit, the trace merge unit, and the output unit during debug operation of the platform.

In an example, the central debug unit includes at least one of: a trigger logic; a filter logic; a packetization logic; and a compression logic.

In an example, a parallel trace interface is configured to receive the time stamped compressed debug information and to parallelize the time stamped compressed debug information.

In an example, a logic is configured to serialize the parallelized time stamped compressed debug information and to output the serialized time stamped compressed debug information via a serial output path. The logic may output the time stamped compressed debug information from the trace merge unit via the serial output path.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a hardware core;
    a central debug unit coupled to the hardware core to receive debug signals from a plurality of sources including at least one hardware source, at least one firmware source, and at least one software source;
    a trace merge unit to receive the debug signals from the central debug unit and having an arbitration logic to select between the debug signals from one or more of the plurality of sources and functional debug signals from a plurality of hardware units, the trace merge unit to time stamp the selected debug signals or functional debug signals;
    a parallel trace interface coupled to receive the time stamped selected debug signals or functional debug signals and to parallelize the time stamped selected debug signals or functional debug signals;
    a serial trace interface coupled to receive the time stamped selected debug signals or functional debug signals and to serialize the time stamped selected debug signals or functional debug signals; and
    a selection unit to receive the debug signals from the central debug unit and the parallelized time stamped selected debug signals or functional debug signals from the parallel trace interface and to select one of the debug signals and the parallelized time stamped selected debug signals or functional debug signals for output on an output path, wherein the output path is to be selected from a plurality of output paths.

2. The apparatus of claim 1, wherein the apparatus comprises a system on chip (SoC) and the plurality of output paths includes one or more of:
    a set of general purpose input/output pins;
    a set of micro secure digital pins;
    a set of memory interconnections; and
    at least one universal serial bus pin.

3. The apparatus of claim 2, wherein the selection unit is configured to output the selected debug signals on the output path corresponding to the set of micro secure digital pins when the SoC is configured within a portable device having a closed chassis.

4. The apparatus of claim 1, further comprising a distributed selection unit comprising:
    a first selection unit located in a first functional unit of a system on chip (SoC) comprising the apparatus;
    a second selection unit located in uncore logic of the SoC, the second selection unit to receive an output from a plurality of first selection units including the first selection unit; and
    a third selection unit to receive an output from a plurality of second selection units including the second selection unit, and output selected debug signals to the central debug unit.

5. The apparatus of claim 2, further comprising a trace collection unit configured to receive trace control signals via a test interface of the SoC and, responsive to the trace control signals, to select one of hardware trace information, software trace information and firmware trace information for output from the trace collection unit to the central debug unit.

6. The apparatus of claim 2, wherein the firmware comprises a boot code for the SoC.

7. The apparatus of claim 2, further comprising a first power domain including a first portion of the central debug unit and a second power domain including a second portion of the central debug unit, wherein the first power domain is to remain powered on and the second power domain is to be powered off while the SoC is to operate in a low power mode.

8. The apparatus of claim 7, wherein the first portion of the central debug unit is to receive and process debug signals associated with the low power mode.

9. The apparatus of claim 7, further comprising a fuse logic configured to disable at least the first portion of the central debug unit during user operation of a portable device including the SoC, wherein the fuse logic is configured prior to inclusion of the SoC in the portable device.

10. The apparatus of claim 9, wherein the fuse logic is configured to be overwritten to enable the first portion of the central debug unit during debug operation of the portable device.

11. The apparatus of claim 1, wherein the parallelized time stamped selected debug signals or functional debug signals are compatible with a Mobile Industry Processor Interface (MIPI) Alliance system trace protocol.

12. At least one non-transitory computer readable medium including instructions that when executed enable a system to:
configure a debug circuit of a processor to collect firmware trace information and hardware trace information, the debug circuit having a first portion located in a first power domain to be powered on when a platform including the processor is on and a second portion located in a second power domain to be powered off when the platform is in a low power state;
in a pre-boot environment of the platform, process the firmware trace information and the hardware trace information in the debug circuit, the first portion of the debug circuit enabled in the pre-boot environment and the second portion of the debug circuit disabled in the pre-boot environment; and
stream the processed firmware trace information and the processed hardware trace information from the processor to an analysis tool coupled to the platform via a selected output path of the processor.

13. The at least one non-transitory computer readable medium of claim 12, further comprising instructions that when executed enable the system to time stamp an error detection event responsive to detection of an error based on information in at least one of the processed firmware trace information and the processed hardware trace information.

14. The at least one non-transitory computer readable medium of claim 12, wherein to process the firmware trace information comprises one or more of filtering, packetization, and compression of the firmware trace information.

15. A system on chip (SoC) comprising:
at least one core to execute instructions, the at least one core including first debug logic to provide first functional debug signals regarding operation of the at least one core;
uncore logic coupled to the at least one core to perform non-core operations, the uncore logic including second debug logic to provide second functional debug signals regarding operation of the uncore logic;
a central debug unit coupled to the at least one core and the uncore logic to receive the first and second functional debug signals, the central debug unit further configured to receive debug information from at least one firmware source and at least one software source and to output compressed debug information;
a trace merge unit to receive the compressed debug information and to time stamp the compressed debug information; and
an output unit to output the time stamped compressed debug information on one of a plurality of output paths, the one output path to be selected according to a configuration provided to the SoC via a test interface.

16. The SoC of claim 15, wherein the plurality of output paths includes one or more of:
a set of general purpose input/output pins;
a set of micro secure digital pins;
a set of memory interconnections; and
at least one serial pin.

17. The SoC of claim 15, wherein the SoC comprises a first power domain to remain powered on when a platform including the SoC is on and a second power domain to be powered off when the platform is in a low power state, wherein the central debug unit includes a first portion included in the first power domain and a second portion included in the second power domain.

18. The SoC of claim 15, further comprising a fuse logic configured to disable the central debug unit, the trace merge unit, and the output unit during user operation of a platform including the SoC, wherein the fuse logic is to be overwritten to enable at least a portion of the central debug unit, the trace merge unit, and the output unit during debug operation of the platform.

19. The SoC of claim 15, wherein the central debug unit includes at least one of:
a trigger logic;
a filter logic;
a packetization logic; and
a compression logic.

20. The SoC of claim 15, further comprising a parallel trace interface to receive the time stamped compressed debug information and to parallelize the time stamped compressed debug information.

21. The SoC of claim 20, further comprising a logic to serialize the parallelized time stamped compressed debug information and to output the serialized time stamped compressed debug information via a serial output path.

22. The SoC of claim 21, wherein the logic is to output the time stamped compressed debug information from the trace merge unit via the serial output path.

* * * * *